(12) United States Patent
Booher (10) Patent No.: US 7,296,846 B2
(45) Date of Patent: Nov. 20, 2007

(54) TRAILER WALL STRUCTURE DEFINED BY VERTICAL EXTRUDED ALUMINUM PANELS

(75) Inventor: Howard Booher, Atwater, OH (US)

(73) Assignee: East Manufacturing Corporation, Randolph, OH (US)

( * ) Notice: Subject to any disclaimer, the term of this patent is extended or adjusted under 35 U.S.C. 154(b) by 0 days.

(21) Appl. No.: 11/513,771

(22) Filed: Aug. 31, 2006

(65) Prior Publication Data

US 2006/0290171 A1 Dec. 28, 2006

Related U.S. Application Data

(60) Division of application No. 11/333,638, filed on Jan. 17, 2006, now Pat. No. 7,100,972, which is a division of application No. 11/195,285, filed on Aug. 2, 2005, now Pat. No. 7,014,252, which is a continuation of application No. 10/745,248, filed on Dec. 23, 2003, now Pat. No. 6,929,311, which is a continuation of application No. 10/177,728, filed on Jun. 21, 2002, now Pat. No. 6,669,271.

(60) Provisional application No. 60/300,232, filed on Jun. 22, 2001.

(51) Int. Cl.
*B60J 5/06* (2006.01)

(52) U.S. Cl. .................................... 296/186.1

(58) Field of Classification Search ............. 296/186.1, 296/182.1, 181.3, 30, 205, 191, 183.1, 203, 296/36

See application file for complete search history.

(56) References Cited

U.S. PATENT DOCUMENTS

| | | |
|---|---|---|
| 2,356,008 A | 8/1944 | Schafer |
| 2,600,140 A | 6/1952 | Torseth |
| 3,848,920 A | 11/1974 | Linhart et al. |
| 3,886,705 A * | 6/1975 | Cornland .................. 52/588.1 |
| 3,995,405 A | 12/1976 | Peterson |
| 4,145,080 A | 3/1979 | Miller et al. |
| 4,356,675 A | 11/1982 | Reicherts |
| 4,357,047 A * | 11/1982 | Katz ....................... 296/186.1 |
| 4,437,699 A | 3/1984 | Lewis et al. |

(Continued)

FOREIGN PATENT DOCUMENTS

CA  2097340  6/1997

(Continued)

OTHER PUBLICATIONS

Koewius et al., Aluminium Designs for the Commercial Vehicle Industry, Aluminium Federation of Southern Africa, 2004 (Translation of German Text published 1990), pp. 142-154, 166-203.

(Continued)

*Primary Examiner*—Kiran B. Patel
(74) *Attorney, Agent, or Firm*—Fay Sharpe LLP (57) ABSTRACT

A smooth side trailer body or body structure comprised of a plurality of extruded panel members positioned adjacent one another. The extruded panels are arranged perpendicular to the floor of a trailer. The panels are held to the floor by a bottom rail. A top rail portion may be used to hold the panels together to form a more rigid wall.

8 Claims, 5 Drawing Sheets

U.S. PATENT DOCUMENTS

| | | | |
|---|---|---|---|
| 4,456,413 A | | 6/1984 | Pavlick |
| 4,546,969 A | * | 10/1985 | Wilson .................... 296/186.1 |
| 4,612,744 A | | 9/1986 | Shamash |
| 4,787,670 A | | 11/1988 | Bentz |
| 4,940,279 A | | 7/1990 | Abott et al. |
| 5,026,112 A | | 6/1991 | Rice |
| 5,041,318 A | | 8/1991 | Hulls |
| 5,042,395 A | | 8/1991 | Wackerle et al. |
| 5,140,913 A | | 8/1992 | Takeichi et al. |
| 5,185,193 A | * | 2/1993 | Phenicie et al. ........... 52/588.1 |
| 5,345,737 A | | 9/1994 | Latchinian |
| 5,403,062 A | | 4/1995 | Sjostedt et al. |
| 5,449,081 A | * | 9/1995 | Sjostedt et al. .............. 220/1.5 |
| 5,507,405 A | | 4/1996 | Thomas et al. |
| 5,553,906 A | | 9/1996 | Kunz |
| 5,588,693 A | | 12/1996 | Higginson et al. |
| 5,608,999 A | | 3/1997 | McNamara |
| 5,613,726 A | | 3/1997 | Hobbs et al. |
| 5,642,827 A | * | 7/1997 | Madsen ...................... 296/191 |
| 5,664,826 A | * | 9/1997 | Wilkens ................. 296/186.1 |
| 5,681,095 A | | 10/1997 | Martin |
| 5,715,641 A | | 2/1998 | Hall, Jr. |
| 5,730,485 A | | 3/1998 | Sjostedt et al. |
| 5,741,042 A | | 4/1998 | Livingston et al. |
| 5,791,726 A | | 8/1998 | Kaufman |
| 5,794,397 A | | 8/1998 | Ludwig |
| 5,852,904 A | | 12/1998 | Yu et al. |
| 5,860,264 A | | 1/1999 | Gephart et al. |
| 5,860,693 A | | 1/1999 | Ehrlich |
| 5,876,089 A | | 3/1999 | Ehrlich |
| 5,934,741 A | | 8/1999 | Beukers et al. |
| 5,938,274 A | | 8/1999 | Ehrlich |
| 5,992,117 A | | 11/1999 | Schmidt |
| 5,997,076 A | | 12/1999 | Ehrlich |
| 6,065,261 A | | 5/2000 | Fehr et al. |
| 6,095,715 A | | 8/2000 | Hulls |
| 6,161,347 A | * | 12/2000 | Yu et al. .................... 52/220.7 |
| 6,199,939 B1 | | 3/2001 | Ehrlich |
| 6,224,125 B1 | | 5/2001 | McCormack |
| 6,224,142 B1 | | 5/2001 | McCormack |
| 6,237,989 B1 | | 5/2001 | Ammerlaan et al. |
| 6,290,285 B1 | | 9/2001 | McCormack |
| 6,349,988 B1 | | 2/2002 | Foster et al. |
| 6,381,977 B1 | * | 5/2002 | Austin, Jr. ................. 62/259.1 |
| 6,412,854 B2 | | 7/2002 | Ehrlich |
| 6,425,626 B1 | | 7/2002 | Kloepfer |
| 6,446,396 B1 | * | 9/2002 | Marangoni et al. .......... 52/36.1 |
| 6,497,451 B1 | | 12/2002 | Jones et al. |
| 6,513,297 B2 | * | 2/2003 | Kloepfer .................... 52/588.1 |
| 6,719,360 B1 | * | 4/2004 | Backs ...................... 296/186.1 |
| 6,854,789 B2 | * | 2/2005 | Kloepfer ................. 296/183.1 |
| 2002/0109377 A1 | | 8/2002 | Ehrlich |
| 2006/0237992 A1 | * | 10/2006 | Lemmons ................ 296/186.1 |

FOREIGN PATENT DOCUMENTS

| | | |
|---|---|---|
| DE | G 88 03 549.2 | 9/1988 |
| DE | 39 30 419 | 3/1991 |
| DE | 295 16 295 U1 | 1/1996 |
| DE | 195 27 569 A1 | 2/1996 |
| DE | 19900548 | 7/2000 |
| EP | 0 079 068 | 5/1983 |
| EP | 03 141 19 | 5/1989 |
| GB | 1158817 | 7/1969 |

OTHER PUBLICATIONS

Koewius et al., Aluminium Konstruktionen des Nutzfahrzeugbaus, Aluminium-Verlag Dusseldorf, 1990, pp. 131-153, 155-192.

* cited by examiner

TRAILER WALL STRUCTURE DEFINED BY VERTICAL EXTRUDED ALUMINUM PANELS

This application is a divisional of application Ser. No. 11/333,638 filed Jan. 17, 2006, now U.S. Pat. No. 7,100,972, which is a divisional of application Ser. No. 11/195,285 filed Aug. 2, 2005, now U.S. Pat. No. 7,014,252, which is a continuation of application Ser. No. 10/745,248, filed Dec. 23, 2003, now U.S. Pat. No. 6,929,311, which is a continuation of application Ser. No. 10/177,728, filed Jun. 21, 2002, now U.S. Pat. No. 6,669,271, which claims priority from and benefit of the filing date of U.S. Application Ser. No. 60/300,232, filed Jun. 22, 2001, and all of said prior applications/patents are hereby expressly incorporated by reference into this specification.

TECHNICAL FIELD

The present invention is directed to a smooth side trailer and body structure having walls formed of interlocking extruded aluminum panels and the method of making the same. Panels are aligned vertically adjacent to one another, with at least one female receiving portion in one: panel engaging at least one male portion an adjacent panel. Adjacent panels form smooth side walls of a trailer.

BACKGROUND

Dump trailers, dump bodies, tipper trailers and walking floor trailers (bulk commodity trailers/bodies), traditionally have been produced in various lengths and capacities and consist generally of a chassis formed principally of one or more I-beams and a plurality of cross frame members joining the same with ground engaging wheel assemblies located under one end of the chassis and retractable support gear situated inwardly of the other end. A dump body comprises a floor structure incorporating longitudinal and cross frame members and a floor thereon with side walls and a front end wall secured thereto. The dump body is pivotally mounted on the chassis adjacent to the rear end thereof and a hoist, usually hydraulically actuated, is positioned between the front end of the dump body to elevate the same. While a variety of metallic materials have been employed to fabricate dump bodies, light weight and high strength metals, such as aluminum and various alloys thereof (hereafter collectively "Aluminum"), have become the favored manufacturing stock because they make possible production of trailers/bodies having low "empty weight" and optimum payload potential.

Aluminum floor, side wall and other components have been produced for dump bodies; however, such components have largely taken the form of either rolled sheet metal and/or a variety of extruded members which were solid throughout. Additionally, such dump body components have typically been joined to one another by known arc welding techniques that not only require highly skilled welding personnel and considerable quantities of energy and consumable materials, but also are less than ideally suited for Aluminum components. In addition, the walls formed by these materials and processes in order to be structurally sound did not form smooth walls. The walls typically utilize reinforcing members at spaced apart intervals along the length of the wall, forming a serrated appearance, which increases wind resistance. High wind resistance and heavy weight increases travel time and fuel consumption in use of the trailer or body.

Thus, a need exists for a trailer/body structure that in addition to being structurally sufficient to accommodate desired loads and uses, like those sheet metal and/or extruded solid forms now commonly employed, are even lighter in weight and have smooth walls. In addition, it would be beneficial to provide such a trailer which does not require substantial amounts of support structures welded to the inside walls which take up valuable capacity. It would also be desirable to form the trailer or body to have increased capacity for use in handling larger volumes of materials where the above desired characteristics would be even more important.

SUMMARY

The present invention provides a body structure wherein the side walls of the trailer body or body are comprised of a plurality of lightweight, high strength extruded metal components which provide smooth outer walls of the trailer body. These and other advantages are provided by a trailer comprising a top rail, a bottom rail, and a plurality of hollow, extruded wall panels positioned vertically adjacent one another wherein the plurality of hollow, extruded wall panels are secured at one end to the top rail and at the opposite end to the bottom rail. Each wall panel comprises an inside wall and an outside wall connected to each other by a first end wall and a second end wall. The first end wall includes a groove that extends along the length of the panel between the top rail and the bottom rail and the second end wall includes a projection that extends along the length of the panel between the top rail and the bottom rail such that the projection of the second wall matingly engages the first wall of an adjacent wall panel. The outside walls of the plurality of wall panels form a smooth exterior trailer wall surface.

These and other advantages are also provided by a method of constructing a trailer comprising the steps of:
  providing a bottom rail having a wall engaging portion and a floor engaging portion;
  attaching the bottom rail floor engaging portion to a floor of the trailer;
  providing a plurality of extruded hollow wall panels wherein each wall panel comprises an inside wall and an outside wall connected to each other by a first end wall and a second end wall and the first end wall includes a groove that extends along the length of the panel and the second end wall includes a projection which that extends along the length of the panel;
  attaching the plurality of wall panels to each other by positioning the projection of the second end wall of a wall panel into the groove of the first end wall of an adjacent wall panel;
  inserting and securing the plurality of interconnected wall panels into the wall engaging portion of the bottom rail; and
  attaching a top rail over the plurality of interconnected wall panels.

DETAILED DESCRIPTION OF THE INVENTION

The present invention will be described herein in reference to the attached figures. It should be understood that although specific embodiments are shown in the drawings and described herein, variations of these embodiments are clearly within the scope of the present invention.

In the following description, "inside" refers to the surface of the body structure walls facing the cargo holding area of the body; "outside" refers to the direction away from the cargo holding area of the body.

Figure 1:
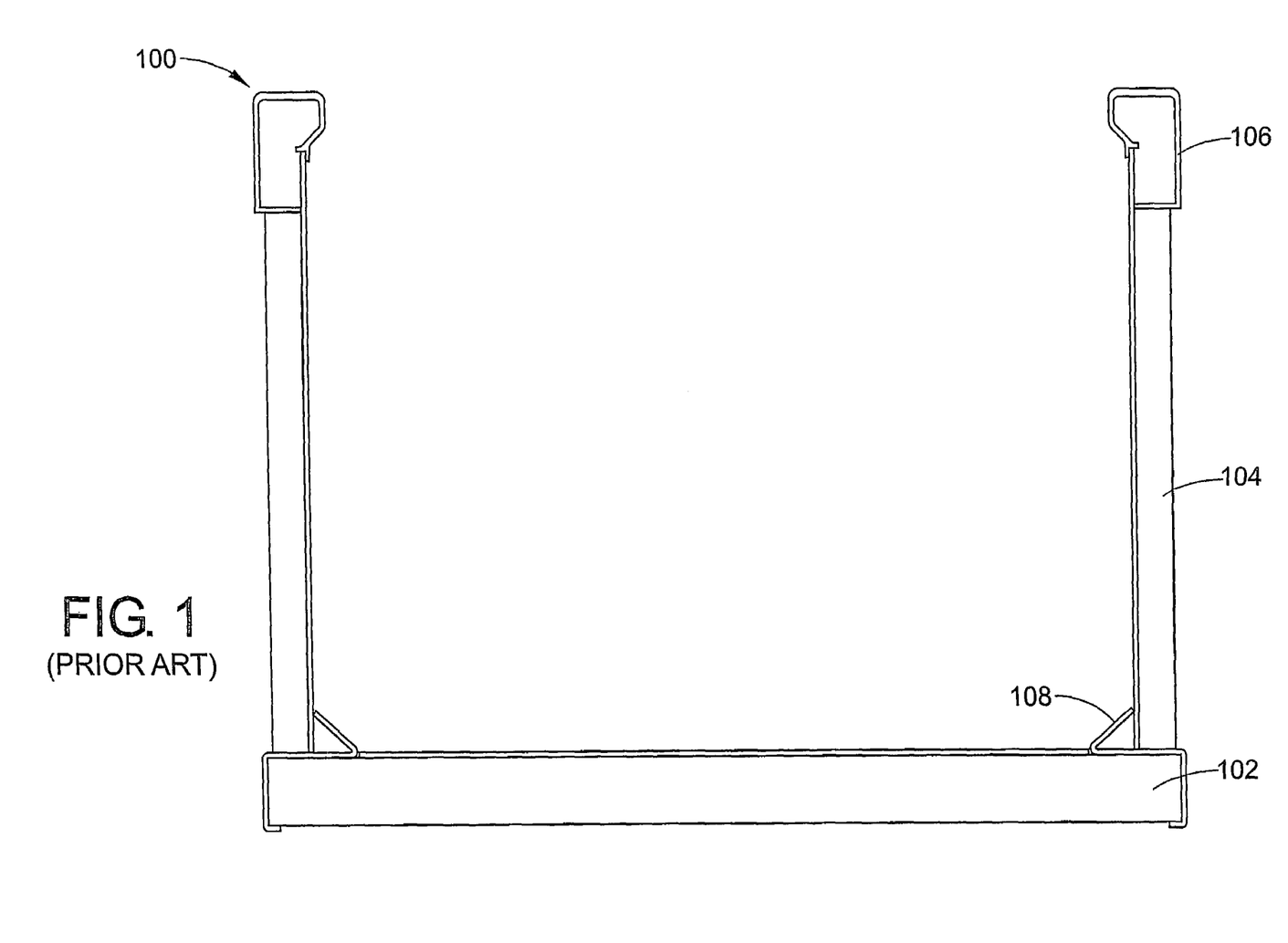
FIG. 1 is a cross sectional view of prior art trailer floor and walls.

FIG. 1 illustrates a cross section of a prior art trailer 100. Prior art bodies are comprised of a floor 102. Side walls 104 were welded to the floor 102 at a bottom portion and then supported by a brace 108, which was welded to both the floor 102 and the wall 104. A top rail 106 was positioned over the top portion of the wall and welded thereto. The prior art walls were generally in the form of either rolled sheet metal and/or a variety of extruded members which were solid throughout. The components were typically joined to one another by arc welding techniques which not only require highly skilled welding personnel and considerable quantities of energy and consumable materials, but also are less than ideally suited for Aluminum components.

Figures 2, 6:
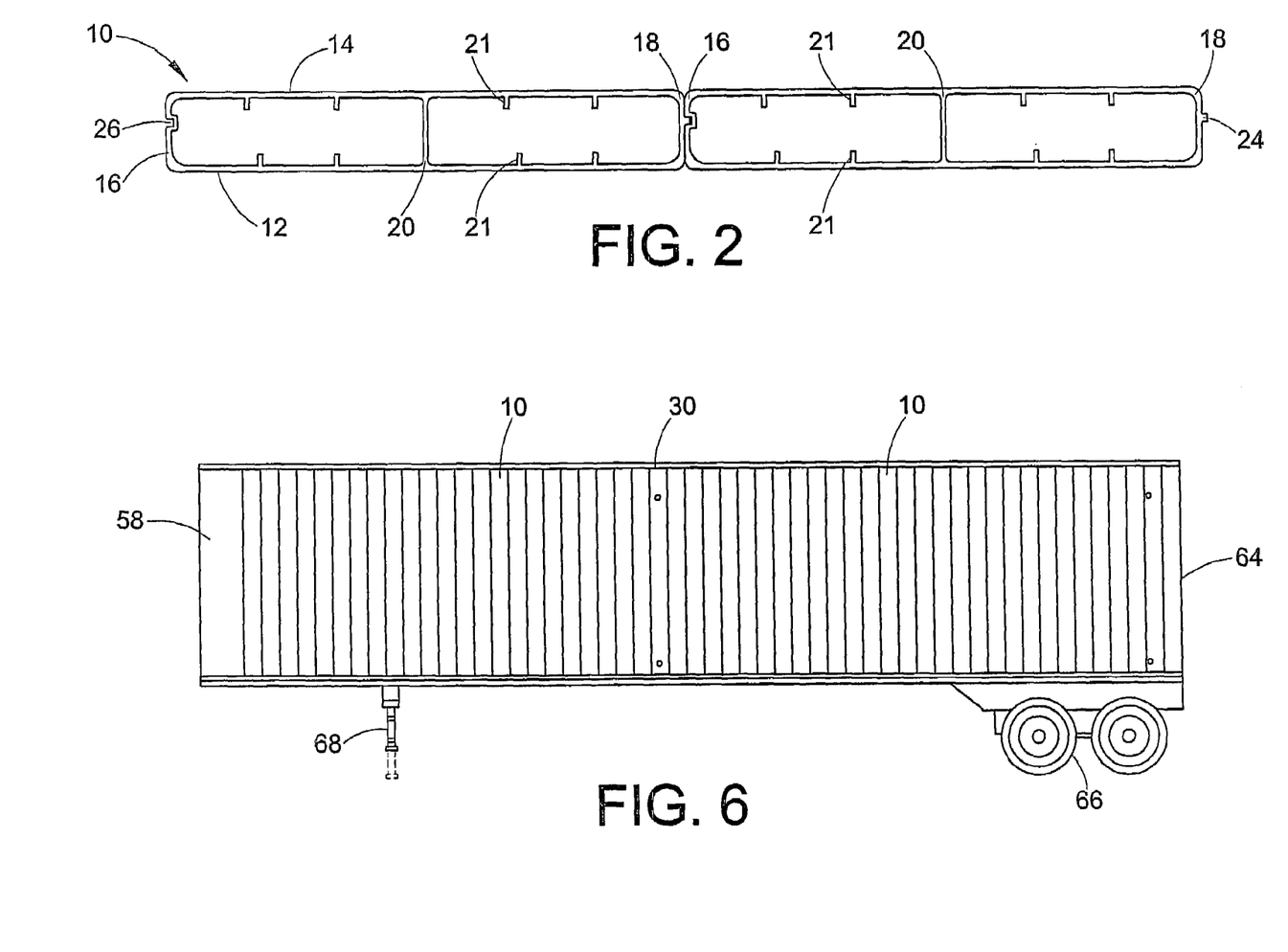
FIG. 2 is a top view of a portion of a smooth wall formed by extruded panels in accordance with the present invention.
FIG. 6 is a side view of a first embodiment of a smooth side tipper trailer in accordance with the present invention.

The body components of the present invention are shown in FIGS. 2 through 8. FIG. 6 shows a typical tipper-type trailer. Tipper trailers are constructed of a chassis (not shown), having one or several spaced parallel I-beams (not shown) with cross frame members therebetween (not shown) and ground engaging wheel assemblies 66 below the back end of the chassis. The trailer further comprises a body structure which includes a floor member or assembly 50 positioned on a plurality of spaced cross frame members (not shown). The floor member 50 supports the side walls, which are comprised of a plurality of adjacent extruded panels 10. The back end of the tipper trailer is designated 64. The back end of the trailer 64 may have an opening through which cargo material in the trailer body will move by gravity when the tipper trailer is elevated. In the alternative, tipper trailers may be configured to be lifted by a tipping machine and inverted such that material will move out of the trailer through the back end 64 or another opening. Those skilled in the art will observe that an opening at the back end of the tipper body is usually closed with a pivotal tail gate and that the front end or bulkhead of the trailer body 58 is provided with the usual front wall typically constructed of a sheet material to join the side walls making an enclosed space. It should be understood that various trailer constructions maybe used with the inventive wall and assembly configurations described herein.

In the present invention, the walls of the trailer are made from a plurality of extruded panels 10 arranged vertically or horizontally and adjacent to one another. A top view of two extruded panels 10 positioned adjacent to one another is shown in FIG. 2. The extruded panels are preferably made of extruded aluminum or another metal, which provides sufficient durability to withstand carrying of cargo as well as contact with extreme environmental elements. The length of the panels is variable depending on the desired height of the trailer walls and body configuration. One of the only limitations on the size of the panel is the capacity of an extruding machine used to make the panels. In one embodiment of the present invention, the hollow spaces in the wall panels 10 are filled with an insulating material such as foam or fiberglass insulation. The insulating material is used to increase the strength of the panels and/or to provide some hot or cold thermal insulation for the body's cargo. In the alternative, solid extruded aluminum wall panels are within the scope of the present invention.

As shown in FIG. 2, each panel 10 is typically hollow and has an inside wall 12, an outside wall 14, and two end walls 16 and 18. Each panel also has intermediate walls 20 which connect the inside wall 12 and outside wall 14 between the two end walls 16 and 18. The intermediate walls 20 also serve to reinforce the inside 12 and outside 14 walls. The number of intermediate walls can be varied based on the width of the extruded panels 10 and the need for additional reinforcement in the panel 10. The wall panels 10 may also comprise reinforcing ribs 21 shown in FIG. 2 projecting from the inside wall 12 toward the outside wall 14 or vice versa The reinforcing ribs 21 provide additional strength and rigidity to the wall panels 10.

Figure 5:
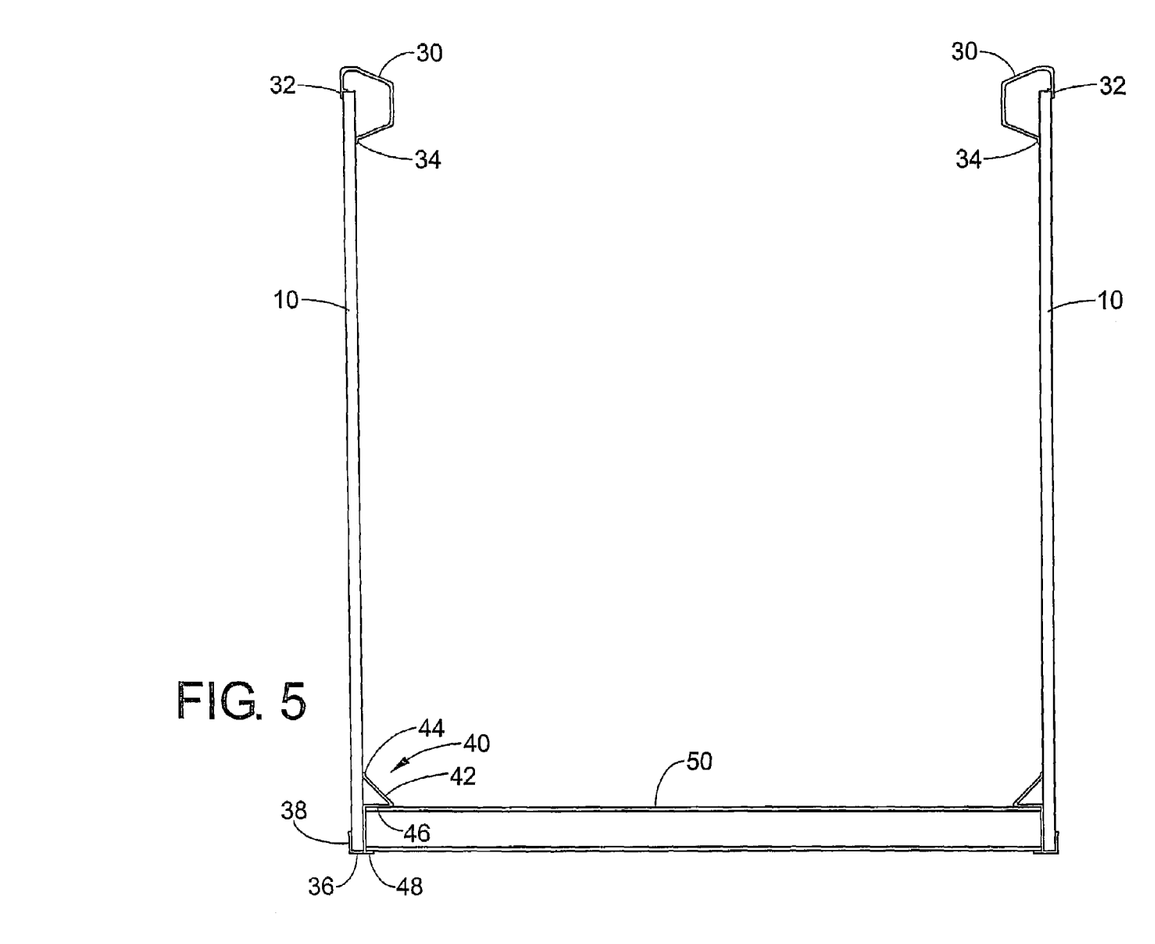
FIG. 5 is a cross sectional view of a trailer floor and walls in accordance with the present invention.

A first end wall 16 is equipped with a groove 26 that extends along the length of the panel between the top rail 60 and bottom rail 40 of trailer (FIG. 5). A second end wall is equipped with a ridge or flange 24. The flange 24 also extends along the length of the panel. The flange 24 and groove 26 correspond to one another and the groove is slightly larger than the ridge so that the ridge of one panel 10 can be inserted into the groove 26 of another panel when the panels are mounted adjacent one another. As shown in FIG. 2, groove 26 and ridge 24 are offset towards the outside wall 14. Seals are created at the flange and groove connection between the two panels. In addition, the flange and groove are positioned on the sides of the extruded panels such that when the panels are positioned adjacent to one another and fit together, the side walls of the body structure is smooth.

It is contemplated by the present invention that the panels may lock together simply by the action of the flange of one panel engaging the groove of a second panel. Alternatively, it should be understood that adhesives may be placed on the sides of the panels between two adjacent panels where the flange and groove engage or the seam between panels can be welded. Other suitable methods of connecting panels to one another or combinations thereof are contemplated. It is also contemplated by the present invention that no flange or groove be present on the panels and that the panels are substantially smooth on all sides. The adjacent panels could be placed adjacent to one another within the bottom rail portion (described in relation to FIG. 3) and secured into place by frame members at the front 58 and rear 64 of the body and/or the top rail member (described in relation to FIG. 4). Furthermore, the smooth panels could be secured together by adhesive and/or welding between adjacent end walls of two panels.

Figure 3:
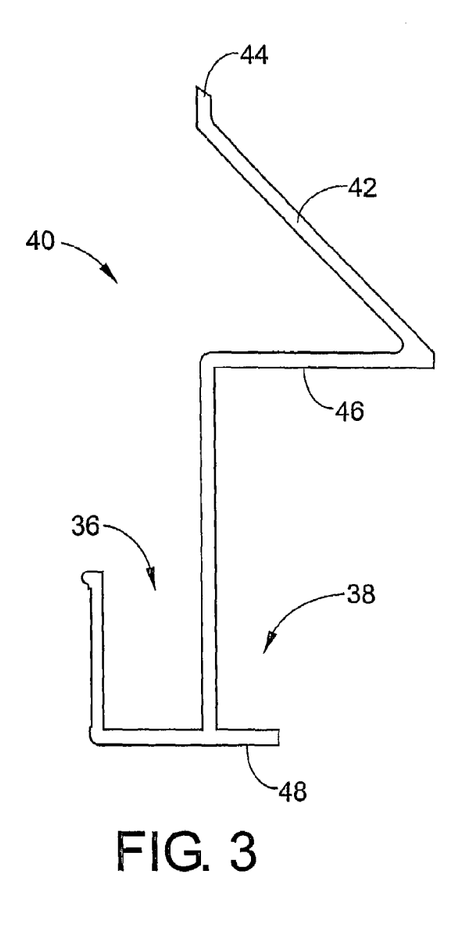
FIG. 3 is a cross sectional view of a bottom rail of a trailer in accordance with the present invention, which connects the extruded panels to the floor of the trailer.

The panels are secured to the floor by the bottom rail apparatus shown in FIGS. 3 and 5 generally designated 40. The bottom rail comprises a wall engaging portion 36, a floor engaging portion 38, and a reinforcement portion 42. The width of the wall engaging region 36 is slightly larger than the width of extruded panels 10 so that extruded panels 10 fit tightly into the wall engaging portion. The floor engaging portion 38 has a lower member 48 which extends below the floor and may be welded thereto. The floor engaging portion 38 also has an upper member 46 which extends a short distance along the surface of the floor 50. The bottom rail also has a reinforcement portion 42 which extends upwards at an angle approximately 45° from the floor. The reinforcement portion 42, as shown in FIG. 5, engages the side wall panels when mounted with the floor engaging portion 38 to form a triangle between the wall 10 and the floor 50. The reinforcement portion also has a flat end portion 44 which is connected, such as by welding or adhesive, to the extruded wall panels 10. The bottom rail 40 may be welded to the floor 50 or wall panels 10 at various places. The reinforcement portion 42 is integral to the bottom rail to provide structural integrity in association with the wall as formed from the plurality of wall panels 10, and yet greatly simplifies manufacturing and reduces labor and materials in the construction. The provision of the reinforcing portion 42 may also allow thinner wall panels 10 to be used while providing the desired structural characteristics, but it should be evident that the characteristics of the wall panels and/or bottom rail 40 could be modified to yield desired structural integrity without the use of the reinforcement portion 42, and thus this portion would not be necessary.

Figure 4:
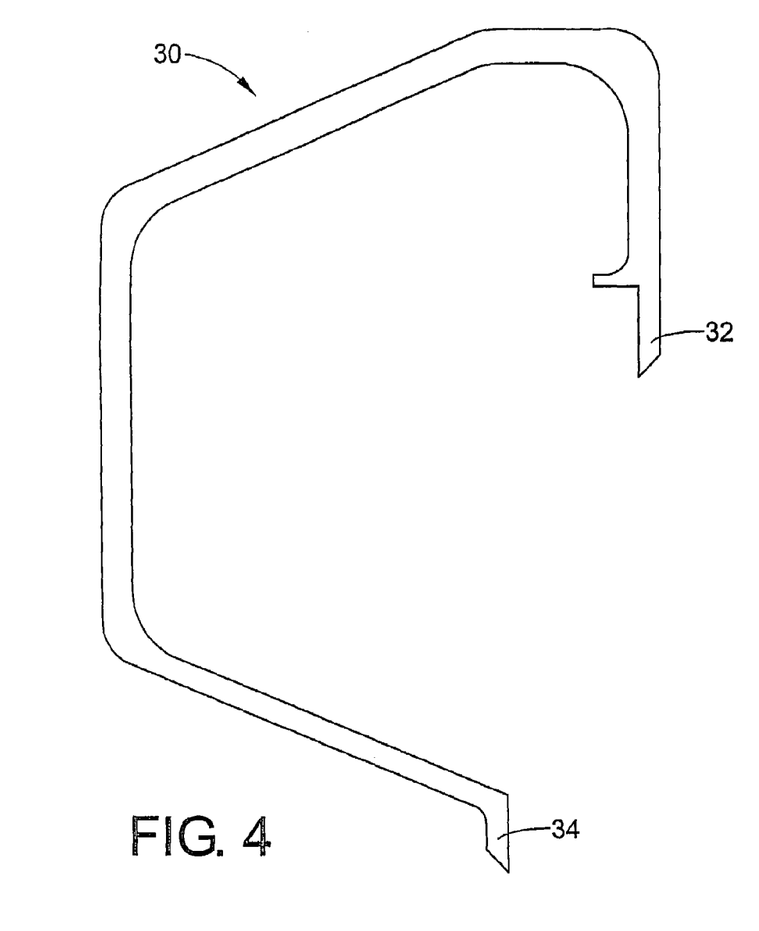
FIG. 4 is a cross sectional view of a top rail in the present invention.

Prior to engagement with the bottom rail 40, the wall panels 10 formed into a wall assembly typically will have some flexibility due to its construction form a plurality of individual panels 10. Once the extruded-panels 10 are positioned adjacent one another in the bottom rail 40, a substantially rigid wall is formed. To further rigidify the wall assembly and to cap the top of the wall, a top rail member 60 as shown in FIG. 4 may be positioned over the top of the extruded panels to further secure the panels together to form a rigid wall. The top rail member 60 is positioned over the top of the extruded panels as shown in FIG. 5, with ends 32 and 34 being connected, such as by welding or adhesive to the respective outer and inner surfaces of the wall panels 10. As shown in FIGS. 2 and 5, inside end 34 extends lower than outside end 32. The top rail member 60 adds additional structural rigidity to the wall assembly and along with the bottom rail 40 tie the walls into the front bulkhead and rear tailgate as well as the floor of the body to form a rigid body having the desired structural characteristics. In the prior art, due to the characteristics of the walls, it many times would be necessary to provide reinforcing tie bars at spaced intervals along the length of the trailer, which extend between the walls. With the wall construction according to the invention, the use of such tie bars may be eliminated, thereby allowing access to the interior of the trailer through the entire top opening along the length of the body.

Figure 7:
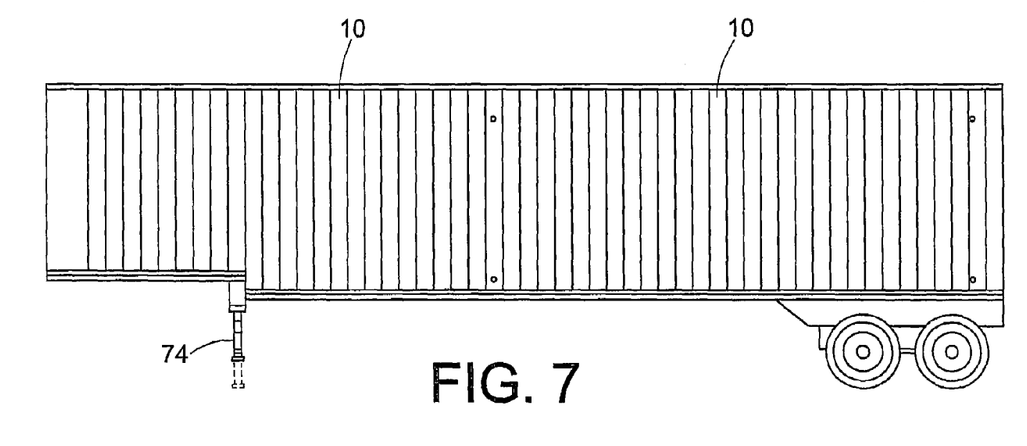
FIG. 7 is a side view of a second embodiment of a smooth side tipper trailer in accordance with the present invention.
Figure 8:
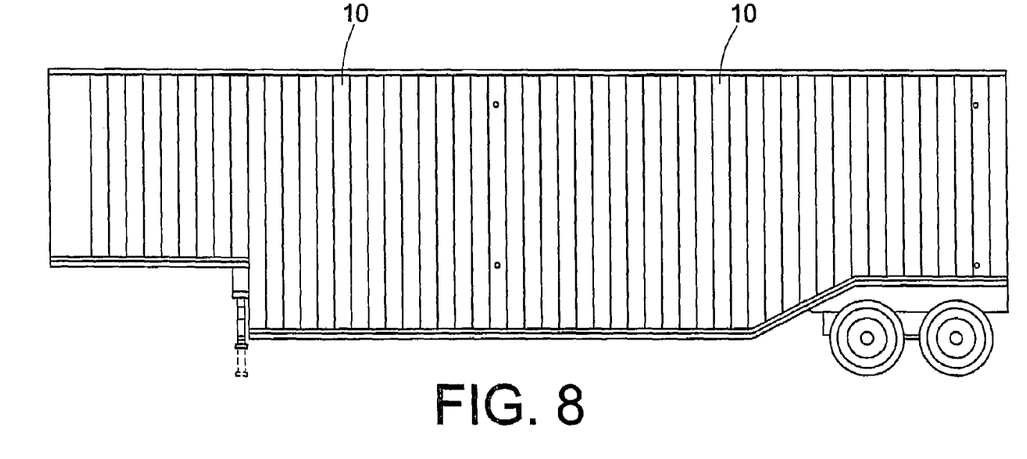
FIG. 8 is a side view of a third embodiment of a smooth side tipper trailer in accordance with the present invention.

The panel arrangement also allows for different body configurations to be constructed. As shown in FIGS. 7 and 8, the volume of the body can be increased by varying the shape of the floor. In FIG. 7, shorter panels are used at a front portion of the body in front of the landing gear member 74. The floor to the rear of the landing gear is dropped to lower creating a larger volume body. Longer vertical extruded panels are used at the portion along the length of the floor where the floor has been lowered.

As shown in FIG. 8, various length panels can be used with another type of variable height floor. Longer panels must be used in the portion of the body wall where the distance between floor and the desired height of the body is the greatest. This creates a body having a greater volume than the body shown in FIGS. 6 and 7, limited only by the width of the extruded vertical panels and the capacity of the trailer floor, axles or landing gear.

As previously discussed and in reference to FIGS. 2 through 8, the method of constructing a trailer comprises the following steps. First, providing a bottom rail 40 having a wall engaging portion 36 and a floor engaging portion 38. Secondly, attaching the floor engaging portion 38 of the bottom rail to a floor 50 of the trailer. Next, providing a plurality of extruded hollow wall panels 20 wherein each wall panel comprises an inside wall and an outside wall connected to each other by a first end wall and a second end wall and the first end wall includes a groove 26 that extends along the length of the panel and the second end wall includes a projection 24 which that extends along the length of the panel. Another step involves attaching the plurality of wall panels 20 to each other by positioning the projection of the second end wall of a wall panel into the groove of the first end wall of an adjacent wall panel. This step can be supplemented by applying an adhesive between the second end wall of a wall panel and the first end wall of an adjacent wall panel and/or welding a seam on an interior seam between the plurality of wall panels. Next, inserting and securing the plurality of interconnected wall panels 20 into the wall engaging portion 36 of the bottom rail. Prior to the last step, the method may include an optional step of filling the plurality of extruded hollow wall panels with an insulating material. Lastly, attaching a top rail 30 over the plurality of interconnected wall panels.

Although the present invention has been described above in detail, the same is by way of illustration and example only and is not to be taken as a limitation on the present invention. Accordingly, the scope and content of the present invention are to be defined only by the terms of the appended claims.

What is claimed is:

1. A method of constructing a wall for a bulk commodity carrying truck or trailer, said method comprising:
   providing a plurality of extruded aluminum hollow wall panels wherein each hollow wall panel comprises an inside wall and an outside wall connected to each other by a first end wall and a second end wall;
   abutting each of said plurality of hollow wall panels with at least another one of said plurality of hollow wall panels so that said plurality of abutted hollow wall panels define a wall section, said wall section comprising: (i) an inner surface defined by the inside walls of the abutted hollow wall panels; (ii) an outer surface defined by the outside walls of the abutted hollow wall panels; (iii) a plurality of seams defined respectively where each of said hollow wall panels is abutted with an adjacent one of said hollow wall panels; and, (iv) bottom and top edges, wherein said seams each extend between said bottom and top edges of said wall section;
   providing a bottom rail comprising a wall engaging region far abutting said bottom edge of said wall section;
   connecting said bottom rail to said bottom edge of said wall section by abutting said bottom edge of said wall section with said wall engaging region of said bottom rail and welding said bottom edge of wall section to said bottom rail;
   providing a top rail;
   connecting said top rail to said top edge of the wall section so that said top rail and said bottom rail are spaced-apart from each other and so that each of said hollow wall panels and each of said seams extends between said bottom and top rails;
   arranging said wall section vertically as a side wall of the bulk commodity carrying truck or trailer with said top rail vertically spaced above said bottom rail, and with each of said hollow wall panels and each of said seams extending vertically between said bottom and top rails.

2. The method of claim 1, further comprising affixing each adjacent abutted pair of panels to each other by a weld located along each of said seams.

3. The method of claim 2, wherein said step of connecting said bottom rail to said bottom edge of said wall section is performed after said step of affixing each adjacent abutted pair of panels to each to each other.

4. The method of claim 1, wherein said step of connecting said top rail to said top edge of the wall section comprises welding said top rail to said inner and outer surfaces of said wall section.

5. The method of claim 4, wherein said step of welding said top rail to said wall section comprises welding each panel of said wall section to said top rail.

6. The method of claim 1, wherein said step of abutting each of said plurality of hollow wall panels with at least another one of said hollow wall panels comprises abutting the first end wall of one of said wall panels with the second end wall of the other of said wall panels, wherein the abutted first and second end walls are parallel to each other, said abutting step further comprising inserting a projection of one of said wall panels into a mating portion of the other of said wall panels, wherein said mating portion comprises a groove defined in said first end wall between said inside wall and said outside wall and said projection comprises a flange projecting from said second end wall between said inside wall and said outside wall.

7. The method of claim 6, wherein said step of inserting said projection of one of said wall panels into said mating portion of the other of said wall panels comprises arranging said wall panels so that said flange and groove aligned with each other, wherein said flange and groove are offset a like distance and direction relative to the inside and outside walls of their respective panels, and wherein said flange and groove are non-centrally located relative to the inside and outside walls of their respective panels.

8. The method of claim 2, wherein said step of affixing each adjacent abutted pair of panels to each other by a weld located along each of said seams comprises welding each of said seams along said inner surface of said wall section so that said inner surface of said wall section is smooth.

* * * * *

UNITED STATES PATENT AND TRADEMARK OFFICE
CERTIFICATE OF CORRECTION

| | | |
|---|---|---|
| PATENT NO. | : 7,296,846 B2 | Page 1 of 1 |
| APPLICATION NO. | : 11/513771 | |
| DATED | : November 20, 2007 | |
| INVENTOR(S) | : Howard Booher | |

It is certified that error appears in the above-identified patent and that said Letters Patent is hereby corrected as shown below:

Claim 1, Col. 6, line 54: change "far" to "for";

Signed and Sealed this
Thirteenth Day of December, 2011

David J. Kappos
*Director of the United States Patent and Trademark Office*